Aug. 19, 1958     J. K. POLHEMUS     2,847,920

DOUBLE EXPOSURE PREVENTION DEVICE FOR PHOTOGRAPHIC CAMERA

Filed July 2, 1954

INVENTOR

JOHN K. POLHEMUS

BY

ATTORNEY 2,847,920

DOUBLE EXPOSURE PREVENTION DEVICE FOR PHOTOGRAPHIC CAMERA

John K. Polhemus, Binghamton, N. Y., assignor to General Aniline & Film Corporation, New York, N. Y., a corporation of Delaware Application July 2, 1954, Serial No. 441,031

3 Claims. (Cl. 95—31)

This invention relates to cameras and is more particularly directed to a novel means for preventing double exposures in a roll-film camera.

There are numerous double-exposure prevention devices in use but, in most cases, the devices have been fairly complicated. Basically, such devices operate to prevent the actuation of the shutter release button or lever until film is wound in the camera to replace the previously exposed portion.

In certain prior art mechanisms, use was made of scissor-like levers which engaged the shaft of the release button and prevented the inward motion of the button which actuated the shutter until the winding knob progressively released the gripping of these levers from the shaft of the knob. This construction has the drawback that as the released button is pressed in prior to shutter release, a clicking noise caused by the engagement of the levers against the shaft of the button can be heard. This often leads to the erroneous assumption by the operator that the shutter is released. In other words, the click of the levers and the click of the shutter can easily be confused by the operator.

Moreover, in this type of arrangement, when, prior to film winding, the release button is locked and prevented from being pressed in, damage may result by inexperienced handling when the operator, not realizing this hold on the button, exerts force on it in an attempt to make an exposure.

Applicant's invention is an improvement on the above type of structure. Instead of locking the release button against exposure operation, it is locked so as to prevent its release until film is wound in the camera; at which time, the button protrudes from the casing ready for exposure actuation.

In this improved structure, when, after exposure, the release button is held by the double-exposure prevention mechanism, the operator may press it without at all damaging the apparatus since the button is free to move further inwardly but will, in no way, actuate the shutter. Only after film has been wound, will the button assume its normal position. There is no need to guard against the click of the hold levers since this occurs after shutter operation and not before. Accordingly, a primary object of the present invention is to provide a device having the above improved operational features which has relatively few parts, is easy to install and positive in its operation.

A further object of the invention is to provide a double-exposure prevention device which is suitable and easily adapted to all types of cameras having a button release and a film winding knob that has a ratcheting and reciprocating motion.

A feature of the present device is that the shutter release position also indicates whether or not the film has been transported because the shutter release button is positively retained in the down position until movement of the winding knob has occurred. A further feature of the invention is that no bulb action or incomplete shutter operation can occur since the shutter release is compelled to complete a full stroke each time it is operated.

Further objects and advantages of the present invention will be readily apparent from the following detailed description taken in connection with the accompanying drawing wherein.

Figure 3:
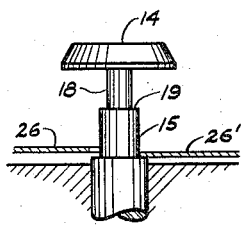
Fig. 3 is a partial detail view showing the shutter release shaft in the up or unlocked position.

Referring to the drawing in detail, numeral 10 indicates the front wall of the camera and numeral 11 is a side wall. The front wall is broken away to show a conventional shutter mechanism 12 operated by a shutter trip lever 13.

The camera trigger 14 is of the push button type having a reciprocating shaft 15 which extends into the camera and engages the shutter trip lever 13. The shaft is propelled outwardly by the shutter actuating spring 17 normally urging the shaft to its open or unlocked position. It will be apparent that the outer end of the shaft extends through an opening in the side wall 11 whereby access may be had to the knob portion of the trigger. The outer portion 18 of the shaft 15 is turned down forming a shoulder 19 for a purpose to be disclosed.

Figure 1:
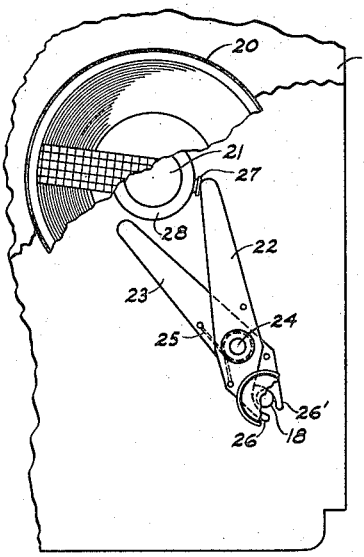
Fig. 1 is a partial side elevational view of the camera with a portion of the side and the film winding knob broken away to clearly show the working parts of the double-exposure prevention mechanism.
Figure 2:
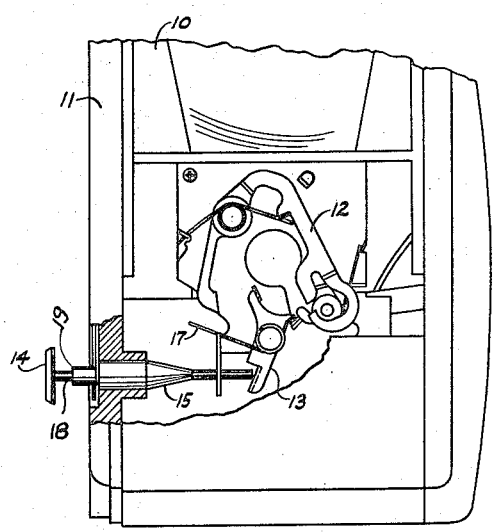
Fig. 2 is a partial front view of the camera with a portion of the camera broken away to show the shutter and the shutter release mechanism.

The winding knob 20 is rotatably supported on a stud 21 secured to the side wall 11. The locking levers 22 and 23 are pivotally mounted to the camera body by a common stud 24. As seen in Fig. 1, the lower ends of the locking levers form jaws 26 and 26' surrounding the portion 18 of the shaft 15 abutting against the shoulder 19. A lock lever spring 25 exerts a constant force which holds both lock levers 22 and 23 scissor-like against reduced portion 18 of the shaft 15. An ear 27 protrudes outwardly from stem 28 of the winding knob 20 and is adapted to alternately engage the lock levers 22 and 23.

Figure 4:
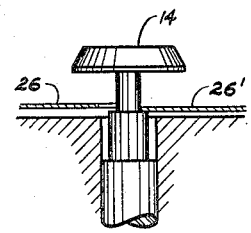
Fig. 4 is a similar view showing the shutter release shaft in a down or locked position.

With the apparatus thus described, it will be obvious that when the parts are in the position shown in Fig. 3, the trigger 14 may be depressed to make an exposure. In the raised position of the trigger, the jaws 26 and 26' of the locking levers 22 and 23, respectively, bear against the shaft 15 through the spring member 25. As the shaft moves inwardly, the shoulder 19 moves first beyond the lower surface of the jaw 26', permitting same to move inwardly and then the shoulder 19 moves beyond the lower surface of jaw 26, permitting it to also move against reduced portion 18 of the shaft 15 abutting against the shoulder 19 and thereby locking the shaft in depressed position as clearly shown in Fig. 4. In order to return the trigger into shutter operating position as shown in Fig. 3, it is necessary to operate the film winding knob 20. The winding mechanism is of the ratchet type (not shown) wherein several reciprocating movements of the winding knob will advance the film. In operating the winding knob, it is first moved clockwise a partial turn. This movement causes the ear 27 to engage lock lever 23 thereby removing the jaw 26' from the shoulder 19 permitting slight outward movement of the shaft 15. There is sufficient resiliency in the lock levers 22 and 23 to permit the shaft 15 of the release button 14 enough motion when one of the jaws is released to pass the jaw while the other may still abut against the shoulder 19.

The winding knob is then moved counterclockwise and, during this movement, the ear 27 engages the other lever 22, removing the jaw 26 from engagement with shoulder 19 and permitting the shaft 15 to move outwardly to open position. The shutter actuating spring 17 thus returns the shaft 15 to its open position permitting the shutter actuating knob 14 to extend from the wall 11 ready for shutter actuation. Since the shaft is positively held in down or locked position, it cannot return to open position until the winding knob is operated to advance the film, thus preventing double exposure of the film.

From the foregoing description, it is readily apparent that the relatively simple structure shown is well adapted to accomplish the objects and advantages of the present invention. Although a preferred embodiment has been shown, it will be understood that minor changes may be made in the details of construction without departing from the spirit of the invention as defined in the appended claims.

I claim:

1. A double-exposure prevention device for cameras comprising a camera, a shutter, a shutter trip lever for actuating said shutter, a reciprocating trigger for operating said shutter trip lever, said trigger having an outer portion extending through the camera, a shoulder formed on said outer portion, said shoulder being an abrupt decrease in cross sectional area of said trigger, said cross sectional area at the camera side of said shoulder being greater than said cross sectional area at the outer side of said shoulder, spring means for urging said trigger outwardly, a pair of lock levers pivotally mounted to the camera, and having their lower ends adapted to engage the aforesaid shoulder at the smaller cross sectional area portion thereof for inwardly locking said trigger after exposure, by interposition of said ends into the path of the larger cross sectional area side of said trigger shoulder when said trigger moves outwardly, a film winding knob carried by the camera, and means on said knob for alternately engaging the locking levers upon rotation thereof for removing the lower ends of said levers from engagement with said shoulder thereby permitting outward movement of the trigger after actuation of said film winding knob.

2. A double-exposure prevention device for cameras comprising a camera, a shutter, a shutter trip lever for actuating said shutter, a reciprocating trigger for operating said shutter trip lever, said trigger having an outer portion extending through the camera, a shoulder formed on said outer portion, said shoulder being an abrupt decrease in cross sectional area of said trigger, said cross sectional area at the camera side of said shoulder being greater than said cross sectional area at the outer side of said shoulder, spring means for urging said trigger outwardly, a pair of lock levers pivotally mounted to the camera, and having their lower ends adapted to engage the aforesaid shoulder at the smaller cross sectional area portion thereof for inwardly locking said trigger after exposure by interposition of said ends into the path of the larger cross sectional area side of said trigger shoulder when said trigger moves outwardly, a film winding knob carried by the camera, and an ear projecting from said knob for alternately engaging the locking levers upon rotation of said knob for removing the lower ends of said levers from engagement with said shoulder thereby permitting outward movement of the trigger after actuation of said film winding knob.

3. A double-exposure prevention device for cameras comprising a camera, a shutter, a shutter trip lever for actuating said shutter, a reciprocating trigger for operating said shutter trip lever, said trigger having an outer portion extending through the camera, a shoulder formed on said outer portion, said shoulder being an abrupt decrease in cross sectional area of said trigger, said cross sectional area at the camera side of said shoulder being greater than said cross sectional area at the outer side of said shoulder, spring means for biasing said lever and simultaneously urging said trigger outwardly, a pair of lock levers pivotally mounted to the camera intermediate the ends of the levers, said levers having their lower ends adapted to engage the aforesaid shoulder at the smaller cross sectional area portion thereof for inwardly locking said trigger after exposure by interposition of said ends into the path of the larger cross sectional area side of said trigger shoulder when said trigger moves outwardly, a film winding knob carried by the camera, and means on said knob for alternately engaging the locking levers upon rotation thereof for removing the lower ends of said levers from engagement with said shoulder thereby permitting outward movement of the trigger after actuation of said film winding knob.

References Cited in the file of this patent

UNITED STATES PATENTS

| 1,271,022 | Duperly | July 2, 1918 |
| 2,367,504 | Hutchison | Jan. 16, 1945 |
| 2,398,412 | Crumrine | Apr. 16, 1946 |
| 2,507,156 | Harvey | May 9, 1950 |
| 2,544,879 | Harvey et al. | Mar. 13, 1951 |

FOREIGN PATENTS

| 694,571 | Great Britain | July 22, 1953 |